United States Patent [19]
Minichan

[11] Patent Number: 5,249,457
[45] Date of Patent: Oct. 5, 1993

[54] ROBOTIC END EFFECTOR

[76] Inventor: Richard L. Minichan, 23 Pineview Dr., Warrenville, S.C. 29851

[21] Appl. No.: 755,422

[22] Filed: Sep. 5, 1991

[51] Int. Cl.⁵ .................................. G01B 5/28
[52] U.S. Cl. .................................................. 73/105
[58] Field of Search .............. 73/105, 866.5, 622, 73/624, 865.5; 324/207.12, 220, 225; 376/245, 249

[56] References Cited

U.S. PATENT DOCUMENTS

| | | |
|---|---|---|
| 4,041,773 | 8/1977 | Hauldren et al. ............ 73/622 |
| 4,056,972 | 11/1977 | Bromwich ................... 73/620 |
| 4,169,758 | 10/1979 | Blackstone et al. .......... 176/19 |
| 4,196,048 | 4/1980 | Qurnell et al. .............. 176/19 |
| 4,505,874 | 3/1985 | Warren et al. .............. 376/249 |
| 4,625,165 | 11/1986 | Rothstein .................. 324/220 |
| 4,819,491 | 4/1989 | McMurtry ................. 73/865.8 |
| 4,856,354 | 8/1989 | Overbay ................... 73/866.5 |
| 5,025,658 | 6/1991 | Elings et al. ............... 73/105 |

FOREIGN PATENT DOCUMENTS 0953602  8/1982  U.S.S.R. .................... 324/225

Primary Examiner—Robert Raevis
Attorney, Agent, or Firm—Harold M. Dixon; William R. Moser; Richard E. Constant

[57] ABSTRACT

An end effector for use in probing a surface with a robotic arm. The end effector has a first portion that carries a gimbal with a probe, the gimbal holding the probe normal to the surface, and a second portion with a set of three shafts within a housing for urging the gimbal and probe against the surface. The second portion contains a potentiometer connected by another shaft to the first portion to measure the position of the first portion with respect to the second so that the second portion can be moved to place and maintain the shafts at the midpoint of their travel. Then, as irregularities in the surface are encountered, the first portion can respond by moving closer to or farther from the second portion.

13 Claims, 3 Drawing Sheets

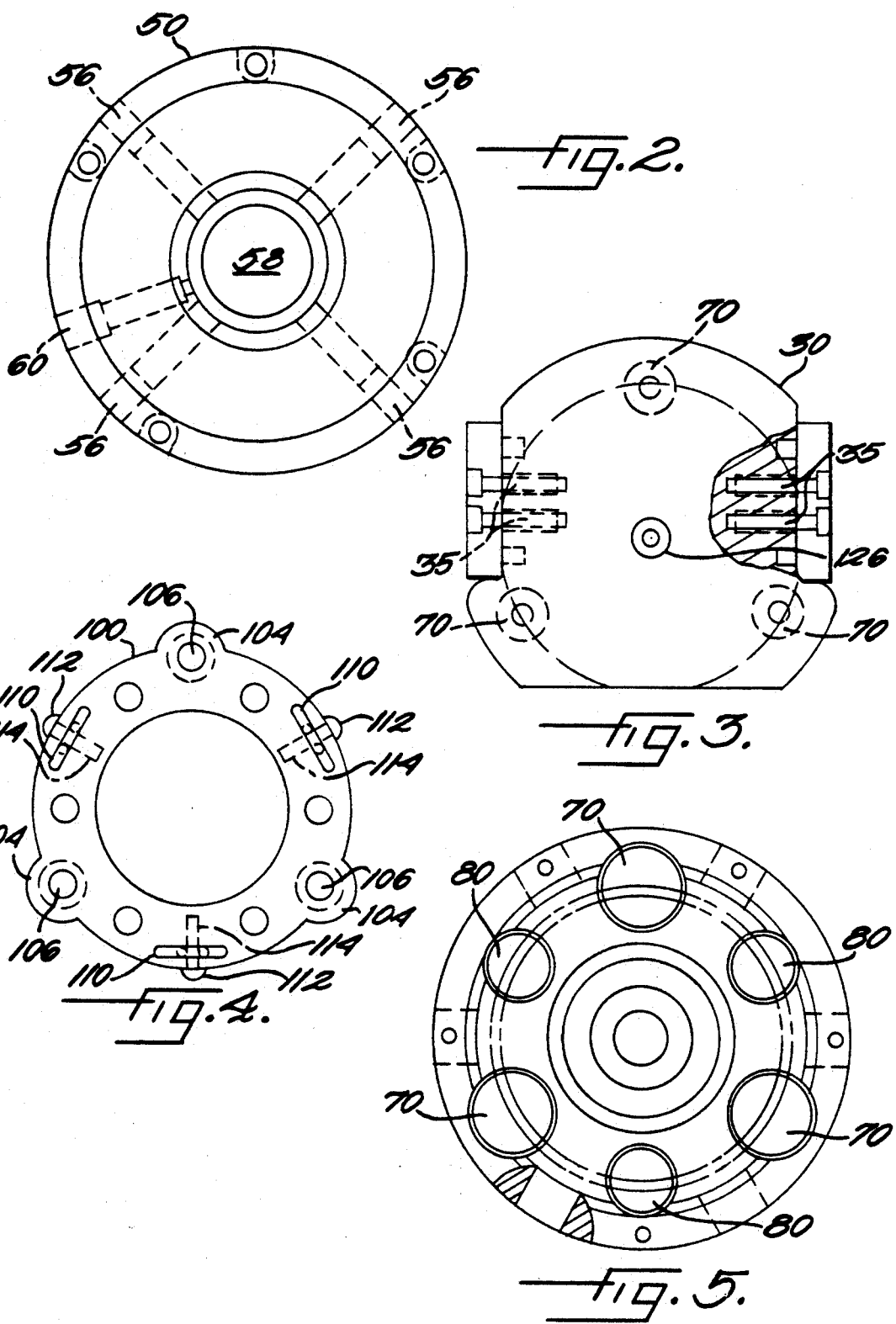

ROBOTIC END EFFECTOR

The Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to end effectors for robotic arms. In particular, the present invention relates to end effectors designed to hold inspection probes against a surface.

2. Discussion of Background

A variety of apparatus are known for manipulating the position of a test probe. For example, Bromwich (U.S. Pat. No. 4,056,972) describes an apparatus containing a clamp and hinged arm capable of testing inaccessible parts of heat exchangers and the like.

Overbay, in U.S. Pat. No. 4,856,354, describes a remotely controlled manipulator for an inspection probe, such as a fiberscope, that allows precise, measured rotational movement and translative advancing and retracting movement. The standard connecting device used in this manipulator to connect the apparatus with its control unit suggests that it can be used in conjunction with a robotic arm.

In U.S. Pat. No. 4,505,874, Warren, et al, describe a remotely controlled supporting arm for an ultrasound transducer "sled" that performs reactor vessel testing. The apparatus pivots about three axes of rotation, each driven by a reversible, variable speed DC motor. The transducer sled is provided with casters, allowing it to travel freely on the sample surface.

Qurnell, et al, in U.S. Pat. No. 4,196,048, describe a manipulator that uses spring tension to keep a transducer positioned on the sample surface while performing corrosion testing. Finally, in Blackstone, et al (U.S. Pat. No. 4,169,758), a manipulator for an ultrasonic transducer is designed to inspect the contour of a reactor vessel according to a predetermined scanning path.

SUMMARY OF THE INVENTION

According to its major aspects and broadly stated, the present invention is an end effector, that is, an apparatus for use with a robotic arm and with one or more probes to probe a surface. The apparatus comprises two major, interconnected portions. One portion has a gimbal that carries the probe and holds the probe in contact with and normal to the surface. The gimbal pivots about two, mutually perpendicular axes, supported by a first plate.

The other portion comprises a housing that contains means for urging the gimbal against the surface and means for maintaining the urging means approximately in the midpoint of its travel distance so that, as the apparatus is moved across the surface, the first portion can respond quickly to irregularities in the surface by moving closer or farther from the second portion as needed.

The urging means further comprises a set of three parallel shafts slidably positioned in and equally spaced about the housing and three springs disposed between, and having axes parallel to, the shafts. The shafts are supported by a second plate, engage the first plate and slide between a first position and a second position which define the limits of their travel distance. The springs attach to the second plate and bias it to urge the shafts against the first plate and, thus, urge the gimbal against the surface.

A potentiometer is located within a chamber inside the housing, with one end attached thereto and an opposing end extending through a hole in the housing to the first portion where it is attached to the first plate. The potentiometer senses the distance between the first and second components, signals a control unit and thereby causes the robotic arm to adjust the position of the second portion so that the shafts are maintained approximately midway between a first position out of the housing and a second position in the housing, so that, as the apparatus is moved over the surface and irregularities are encountered, the gimbal can be moved in or out as needed to maintain contact.

A feature of the present invention is the cooperation between the first and second portions in maintaining the shafts of the second portion at a distance half-way between their minimum and maximum travel. The advantage of this feature is more rapid response to irregularities in the surface being scanned by the probes. As the end effector moves across the surface, any irregularities, that is, variations in the surface topography, that are encountered will cause the first portion to move closer to or farther from the second portion. By maintaining the first portion approximately midway in its travel distance, the response to surface irregularities is quicker regardless of which direction they move the first portion.

Another feature of the present invention is the use of a gimbal having two mutually perpendicular axes to maintain normal contact with the surface being probed. Especially in the case of ultrasonic and eddy current probing, contact normal to the surface is important to maintain for reliable measurements. A gimbal according to the preferred embodiment maintains such contact.

Still another feature of the present invention is the support to the first portion provided by the second portion, namely, the combination of three shafts, biased by three springs. The use of three shafts provides steady, three point support with minimum material for a more compact design.

Another feature of the present invention is a dynamic seal for preventing intrusion of water, or other fluids into the chamber where the potentiometer is located. Thus the end effector according to the present invention can be used underwater.

Furthermore, the arrangement of features of the present invention is particularly compact and can be constructed to fit through a relatively small outer dimensional envelop.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 2 is a bottom view of the end effector of FIG. 1;

FIG. 3 is a cross sectional view of the end effector of FIG. 1 taken along lines 3—3 showing the gimbal plate;

FIG. 4 is a cross sectional view of the end effector of FIG. 1 taken along lines 4—4;

FIG. 5 is a cross sectional view of the end effector of FIG. 1 taken along lines 5—5;

DETAILED DESCRIPTION OF A PREFERRED EMBODIMENT

Figure 1:
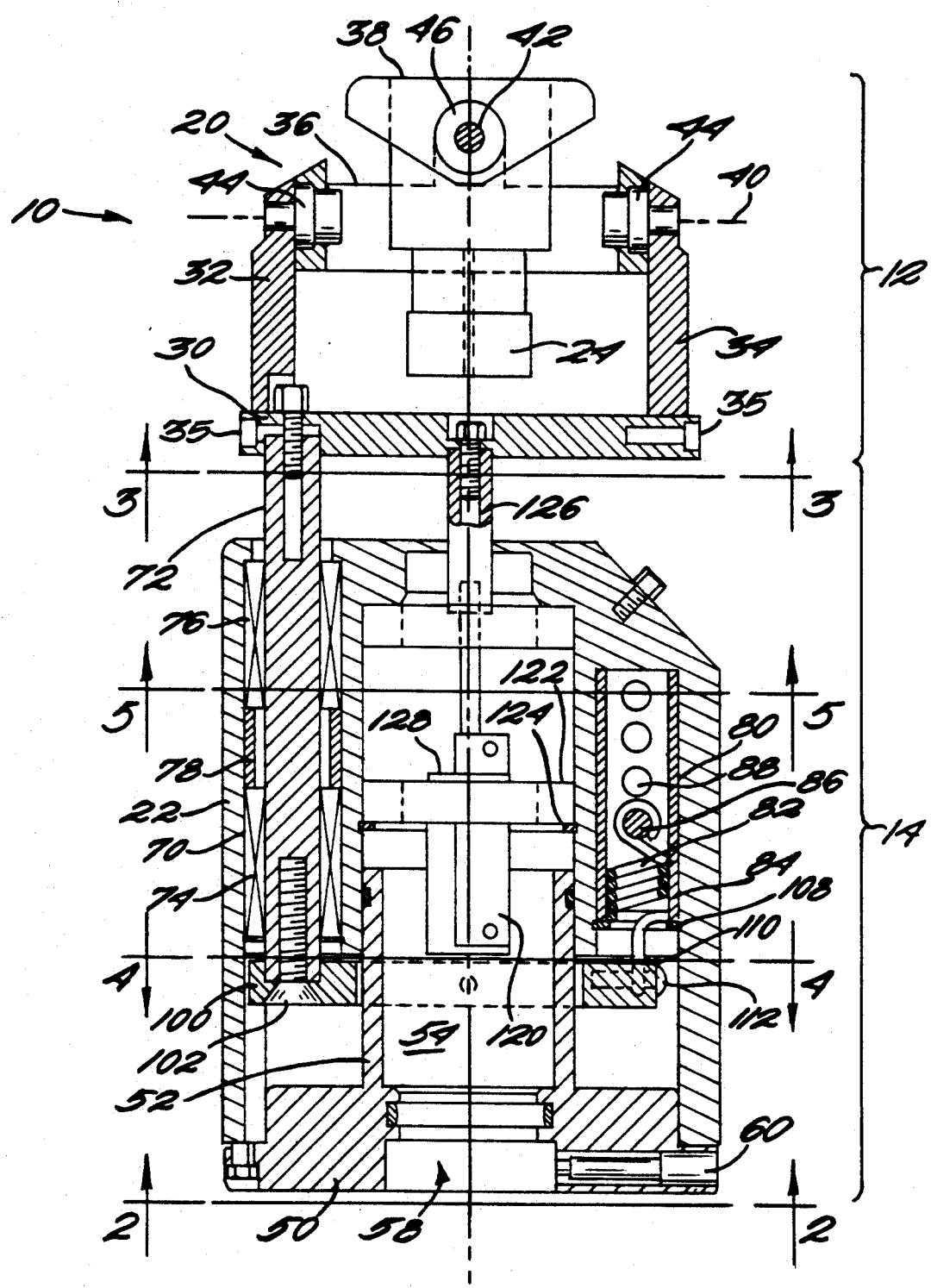
FIG. 1 is a cross-sectional view of an end effector for holding a probe according to a preferred embodiment of the present invention.

Referring now to FIG. 1, an apparatus according to the present design is illustrated. The apparatus is an end effector 10 to be used with a robotic arm and one or more probes (no arm is shown in FIG. 1). The purpose of end effector 10 is to hold the probes against a surface, and, in particular, an irregular surface, as the end effector is moved across the surface and encounters variations in the surface topography such as curves, weldments and angled surfaces.

Figure 6:
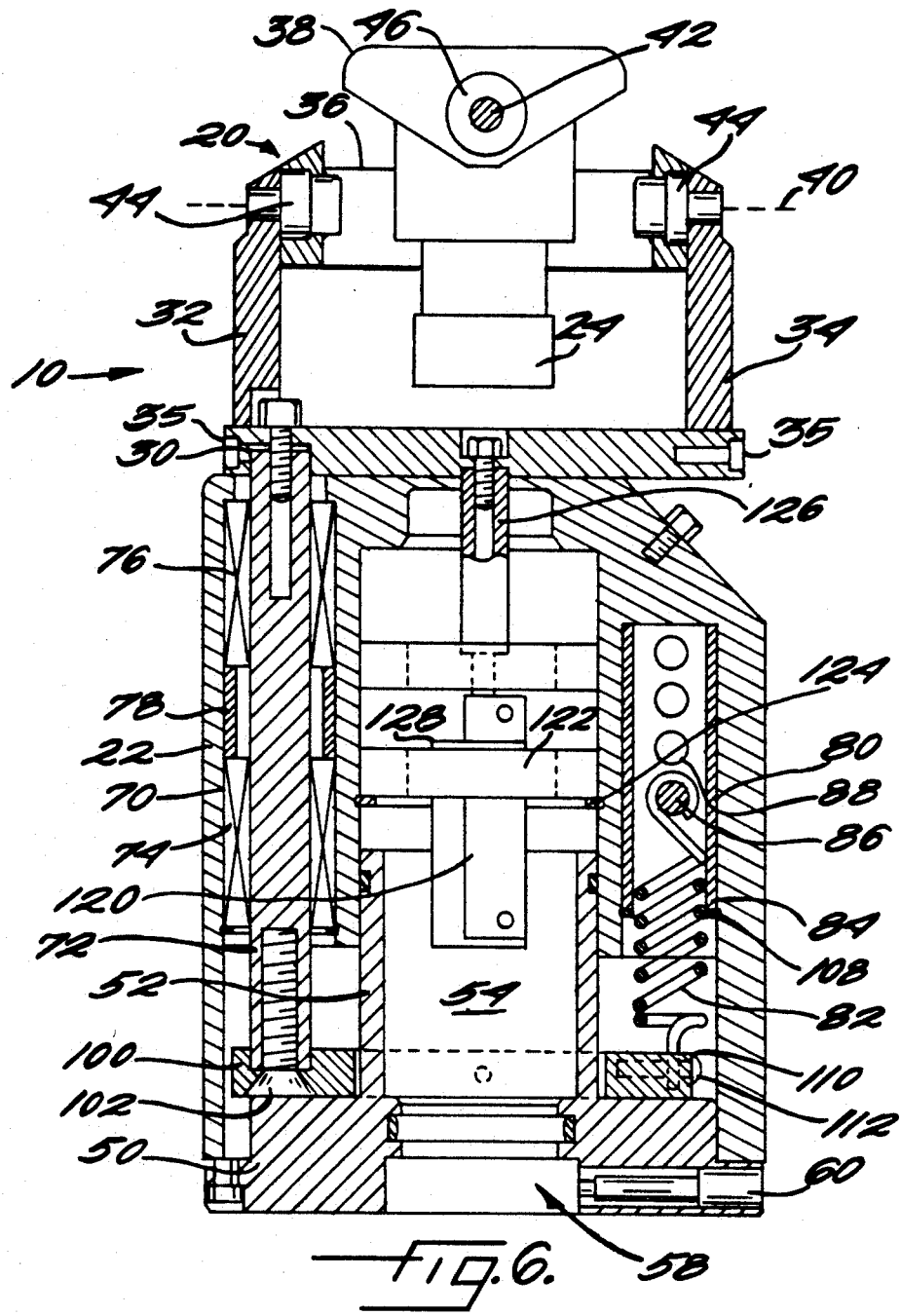
FIG. 6 is a cross-sectional view of the end effector with the first portion in its at the opposite end of travel of that shown in FIG. 1.

End effector 10 has two portions, a first portion 12 and a second portion 14 connected to the first in such a way that the two portions can move closer or farther away from each other as irregularities in the surface are encountered (as can be seen by comparing the views shown in FIGS. 1 and 6). First portion 12 comprises in the main a gimbal 20 and one or more probes 24. Second portion 14 comprises a housing 22, means for urging gimbal 20 against the surface and means for maintaining the first portion at the midpoint of its travel, as will be described presently.

First portion 12 has a gimbal plate 30 on which is mounted a first set of upstanding arms 32, 34 attached by a set of screws 35. Arms 32, 34 rotatably support a second set of arms 36 (the front arm being removed in FIGS. 1 and 6). Second set of arms 36 rotatably support a face 38. Second set of arms 36 rotate about a first axis 40; face 38 rotates about a second axis 42 orthogonal to first axis 40. Two sets of shoulder screws 44, 46 connect pivotally first set of arms 32, 34 to second set of arms 36, and second set of arms 36 to face 38, respectively. Therefore, face 38 can pivot about two mutually perpendicular axes 40 and 42 and thus normally engage the surface being inspected. A probe 24, such as an eddy current probe or an ultrasonic testing probe, is held by face 38 against the surface.

Second portion 14 has an end cap 50 that fits into the end of housing 22. End cap 50 has a cylindrical extension 52 extending into housing 22 which, together with housing 22, defines a central chamber 54. End cap 50, as best seen in FIG. 2, also has four small diameter passages 56 bored from its periphery to a recess 58 in its interior for receiving set screws, and a fifth passage 60 for receiving a locator pin (FIG. 1). Locator pin passage 60 allows a locator pin to establish the correct orientation of end effector 10 onto a robotic arm; set screw passages 56 enable set screw to secure end effector 10 to the robotic arm (not shown).

The annular space formed by cylindrical extension 52 is largely occupied by housing 22 (FIGS. 1 and 5), but housing 22 has six cylindrical openings disposed peripherally about central chamber 54, three openings 70 of which openings are slightly larger than the remaining three openings 80 and the two sizes of openings alternate about the periphery of housing 22, all openings lie in parallel to each other and to the axis of second portion 14. In the three larger openings 70 are slidably inserted three shafts 72 surrounded in each opening 70 by two linear ball bushings 74, 76 separated by a spacer 78 to assure a smooth and low-friction motion of shafts 72 in and out of openings 70. On either side of shafts 72, in openings 80, are springs 82. Springs 82 are fitted within sleeves 84 which have a series of holes 88 along a portion of their lengths. Holes 88 accommodate pins 86 for setting different spring tension by first extending springs 82 upward and inserting pins 86 through holes 88 to hold springs 82 in an extended state.

Shafts 72 engage a second plate 100, held to second plate 100 by screws 102. Second plate 100, also shown in FIG. 4, has three ears 104, or enlargements for the screw holes 106. Sleeves 84 are held in place by a retaining ring 108 (FIG. 1). Springs 82 pull up on second plate 100, and are attached to second plate 100 by forming loops in the ends of springs 82 and inserting the loops into channels 110 cut into the top face of second plate 100. Pins 112 are inserted into holes 114 in the sides of second plate 100, through the loops in springs 82. Thus springs 82 urge shafts 72 to slide upward, out of second portion 14 and to hold gimbal 20 of first portion 12 against a surface.

Figure 7:
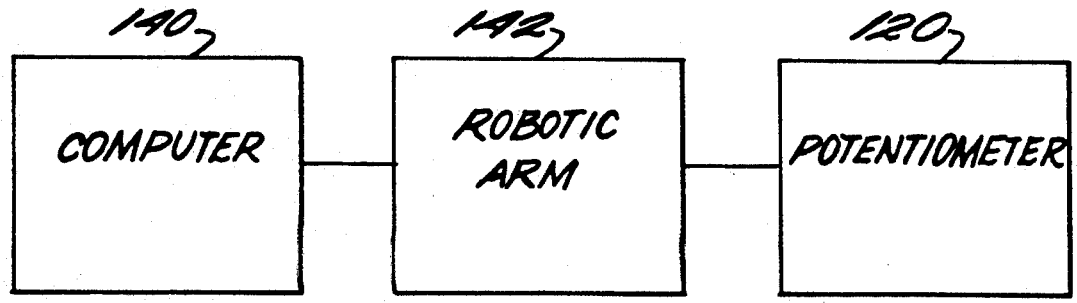
FIG. 7 is a schematic view of the system including a robotic arm and a control device.

Inside central chamber 54 is a potentiometer 120, secured to a potentiometer mount 122 that slides into chamber 54 until stopped by the bottom of chamber 54 and is retained by retainer ring 124. Potentiometer 120 is connected to gimbal plate 30 via a potentiometer shaft 126. As first portion 12 moves toward and away from a surface (compare FIGS. 1 and 6), potentiometer shaft 126 moves with it, in and out of housing 22, causing potentiometer 120 to signal its position. A limit switch 128 prevents potentiometer shaft 126 from moving in or out beyond preset limits. Potentiometer 120 can send signals to a computer 140 (FIG. 7), such as a programmed general purpose computer or special purpose computer, that controls the robotic arm 142 based on feedback from potentiometer 120 carried by end effector 10 and requires it to make an adjustment of its position so that end effector 10 maintains contact with the surface and holds first portion 12 in a position where it can be responsive to irregularities encountered in the surface.

The range of travel of shafts 72 into and out of housing 22 is limited to a relatively small distance for best control, preferably only one to two centimeters. In order to use this range effectively, second portion 14 moves in or out with respect to first portion 12 to keep shafts 72 at the midpoint of their travel, that is, halfway between their first position all the way extended and their second position all the way out (compare FIGS. 1 and 6). Then, as face 38 encounters irregularities in the surface being inspected, first portion can respond in either direction, in or out, quickly. As soon as first portion 12 responds, potentiometer 120 signals its new position to computer 140 which, in turn, causes robotic arm to move out or in, respectively, so that shafts 72 return to their midpoints.

It will be apparent to those skilled in the art that many changes and substitutions can be made to the preferred embodiment herein described without departing from the spirit and scope of the present invention as defined by the appended claims.

What is claimed is:

1. An apparatus for holding a probe against a surface, said apparatus comprising:
   a housing;
   means for holding said probe normal to said surface, said means including a gimbal, having;

a first pair of pivot arms having a first axis therethrough, a second pair of pivot arms having a second axis therethrough, said second axis perpendicular to said first axis, said second pair of pivot arms perpendicular to said first pair of pivot arms, and a face rotatably mounted to said second pair of pivot arms, said first pair of pivot arms supporting said second pair of pivot arms so that said face can rotate about said first and said second axes;

means within said housing for urging said gimbal against said surface, said urging means operationally connected to said gimbal and having a travel distance; and means for maintaining said urging means approximately in the midpoint of said travel distance so that, as said apparatus is moved over said surface, said gimbal can respond by rotating to irregularities in said surface.

2. The apparatus as recited in claim 1, wherein said gimbal further comprises a plate and said urging means further comprises:

a plurality of shafts engaging said plate; and means for biasing each shaft of said shafts against said plate.

3. The apparatus as recited in claim 2, wherein said biasing means further comprises a plurality of springs and said urging means further comprises means for adjusting the tension of said plurality of springs.

4. The apparatus as recited in claim 1, wherein said maintaining means further comprises a potentiometer for sensing said travel distance and said housing further comprises a chamber formed therein for securing said potentiometer thereto, said potentiometer operatively connected to said gimbal and generating a signal proportional to said travel distance.

5. The apparatus as recited in claim 4, wherein said maintaining means further comprises means for adjusting the location of said urging means in response to said signal from said potentiometer so that said urging means is moved to approximately said midpoint of said travel distance.

6. An apparatus for use with a robotic arm in probing an irregular surface, said apparatus comprising:

a housing;

a probe;

gimbal means for holding said probe against said surface, said gimbal means rotatable about two perpendicular axes;

means within said housing for urging said holding means against said surface, said urging means operationally connected to said holding means and having a travel distance;

means for maintaining said urging means approximately in the midpoint of said travel length so that, as said apparatus is moved over said surface, said holding means can hold said probe against said surface and respond to irregularities in said surface; and means for securing said apparatus to said robotic arm.

7. The apparatus as recited in claim 6, wherein said gimbal means further comprises:

a first pair of pivot arms having a first axis therethrough;

a second pair of pivot arms having a second axis therethrough, said second axis perpendicular to said first axis;

said second pair of pivot arms perpendicular to said first pair of pivot arms, a face rotatably mounted to said second pair of pivot arms;

said first pair of pivot arms supporting said second pair of pivot arms so that said face can rotate freely about said first and said second axes.

8. The apparatus as recited in claim 6, wherein said maintaining means further comprises:

a potentiometer for sensing said travel distance, said potentiometer operatively connected to said holding means and generating a signal proportional to said travel distance; and means for adjusting the location of said urging means in response to said signal from said potentiometer so that said urging means is moved to approximately said midpoint of said travel distance.

9. The apparatus as recited in claim 6, wherein said holding means further comprises a plate and said urging means further comprises:

a plurality of shafts engaging said plate; and a plurality of springs biasing each shaft of said plurality of shafts against said plate.

10. The apparatus as recited in claim 9 wherein said urging means further comprises means for adjusting the tension of said plurality of springs.

11. An apparatus for use with a robotic arm in probing an irregular surface, said apparatus comprising:

a housing;

a first pair of pivot arms having a first axis therethrough;

a probe rotatably mounted to said first pair of pivot arms, said probe engaging said surface;

a second pair of pivot arms having a second axis therethrough, said second axis perpendicular to said first axis;

said second pair of pivot arms supporting said first pair of pivot arms so that said probe can rotate about said first and said second axes;

a first plate attached to said second pair of pivot arms;

a plurality of shafts slidably received within said housing and engaging said first plate, said shafts slidable between a first position with respect to said housing and a second position;

means for urging said plurality of shafts against said first plate; and means for maintaining said plurality of shafts approximately in the midpoint between said first position and said second position so that, as said apparatus is moved over said surface, said shafts can hold said contact against said surface in response to irregularities in said surface.

12. The apparatus as recited in claim 11, wherein said urging means further comprises:

a second plate supporting said second ends of said plurality of shafts;

a plurality of springs engaging said second plate and biasing said second plate against said plurality of shafts; and means for adjusting the tension of said plurality of springs.

13. The apparatus as recited in claim 11, wherein said maintaining means further comprises:

a potentiometer for sensing said travel distance, said potentiometer operatively connected to said first plate and generating a signal proportional to said travel distance; and means for adjusting the location of said housing in response to said signal from said potentiometer so that said plurality of shafts moved to approximately said midpoint between said first position and said second position.

* * * * *